United States Patent [19]

Labedan et al.

[11] Patent Number: 5,531,526

[45] Date of Patent: Jul. 2, 1996

[54] CARTRIDGE FOR A ROLLING BEARING HAVING AN OBLIQUE CONTACT AND THE APPLICATION THEREOF IN A VEHICLE STEERING COLUMN

[75] Inventors: Jean-Denis Labedan, Bourges; Laurent Regnier, Vierzon, both of France

[73] Assignee: Nadella, Vierzon Cedex, France

[21] Appl. No.: 421,925

[22] Filed: Apr. 14, 1995

[30] Foreign Application Priority Data

Apr. 15, 1994 [FR] France ................... 94 04546

[51] Int. Cl.⁶ .......................... F16C 33/58; F16C 27/06
[52] U.S. Cl. .......................... 384/518; 384/536
[58] Field of Search ................... 384/490, 495, 384/518, 536; 74/484 R, 485, 490, 492; 180/78; 280/779, 780

[56] References Cited

U.S. PATENT DOCUMENTS

| 1,511,905 | 10/1924 | Oldham | 384/589 |
|---|---|---|---|
| 2,164,497 | 7/1939 | Chamberlin | 384/518 |
| 2,232,473 | 2/1941 | Pulleyblank | 384/518 |
| 4,174,764 | 11/1979 | Mutschler | 180/78 |
| 4,541,742 | 9/1985 | Lederman | 384/518 |
| 4,699,528 | 10/1987 | Gotman | 384/536 |
| 4,979,834 | 12/1990 | Speich | 384/518 X |
| 5,193,917 | 3/1993 | Adber et al. | 384/536 X |

FOREIGN PATENT DOCUMENTS

| 1259148 | 1/1968 | Germany . |
| 8906357 | 8/1989 | Germany . |
| 509802 | 7/1939 | United Kingdom . |
| 2231099 | 11/1990 | United Kingdom . |

Primary Examiner—Thomas R. Hannon
Attorney, Agent, or Firm—Wenderoth, Lind & Ponack

[57] ABSTRACT

The cartridge includes a case with two sections and a connection portion interconnecting the sections and capable of containing in a chamber a rolling bearing including an outer ring which has a bearing surface and a raceway, an inner ring which has a bearing surface and a raceway and rolling members. The case has a support region which is located on the connection portion and is adapted to receive the outer bearing surface. A collar is placed in the chamber and has an end portion coming into contact with the inner bearing surface of the inner ring.

22 Claims, 4 Drawing Sheets

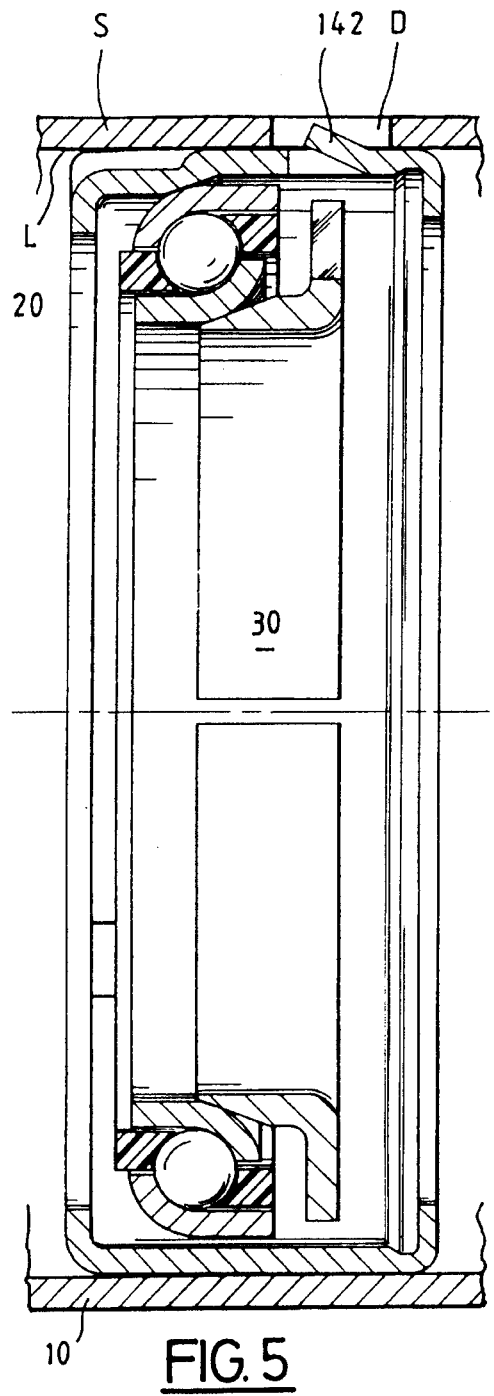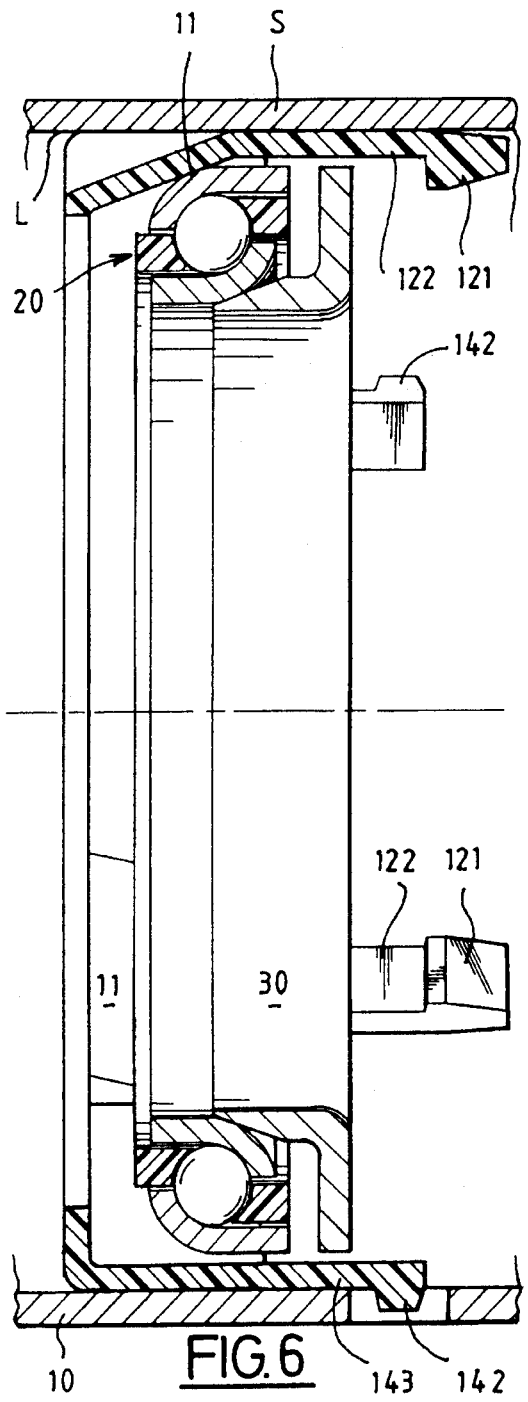

5,531,526

CARTRIDGE FOR A ROLLING BEARING HAVING AN OBLIQUE CONTACT AND THE APPLICATION THEREOF IN A VEHICLE STEERING COLUMN

BACKGROUND OF THE INVENTION

The present invention relates to rolling bearings, for example ball bearings, having an oblique contact and, more particularly, the invention provides a cartridge for a bearing of this type and the application thereof for example in a steering column for a vehicle, for example a ground motor vehicle.

In many applications, such as those concerning steering columns for motor vehicles and in particular ground vehicles, it is necessary to guide in rotation a shaft mounted in a support by means of at least one rolling bearing, for example a ball bearing, having an oblique contact interposed between the shaft and the support and placed in a housing of the support.

In such applications, the rolling bearings employed must be capable of accepting manufacturing tolerances and defects in the shape of the housings which are sometimes very large, while operating without play and retaining a small rotation torque. Further, the operation must occur with a very low level of noise and practically without transmission of vibrations.

Further, the assembly and the utilization of such rolling bearings must be as simple as possible.

Various arrangements have already been proposed for this type of utilization but none of them is fully satisfactory at acceptable production costs and utilization, and with a satisfactory life span.

Some proposed arrangements often comprise a hoop of synthetic material which maintains from the outside all the components of the oblique contact rolling bearing. Other arrangements employ a rolling bearing whose outside diameter is offset relative to the torus of the raceway instead of being tangent to the latter. It will be observed that the last-mentioned arrangement remains nonetheless dependent on large ovalizations which often affect the steering column supports in particular those provided with notches. Other arrangements employ both a hoop and a tolerance ring of synthetic material.

Examples of these arrangements are for example disclosed in the documents FR 2 426 828, FR 2 426 829, FR 2 586 069, FR 2 628 160 and FR 2 669 086, reference to which may be had for further information.

SUMMARY OF THE INVENTION

An object of the invention is to overcome these types of difficulties by means of a cartridge for a rolling bearing, for example a ball bearing, having an oblique contact, which constitutes an inseparable unit ready for use, which avoids the manufacturing tolerances and defects in the shape of the housing intended to receive it which would have a harmful effect on its normal good operation, which filters noise and vibrations while being however of relatively modest cost as concerns production and utilization.

The invention therefore provides a cartridge for a rolling bearing, in particular a ball bearing, having an oblique contact, which cartridge is intended to be placed in a housing and comprises in particular a case with two successive axial sections having different specific sizes with an intermediate connection portion uniting such sections and is adapted to contain in a chamber a rolling bearing comprising an outer cup-shaped ring which has an outer bearing surface and a toric outer raceway, an inner cup-shaped ring which has an inner bearing surface and a toric inner raceway, and rolling members optionally located in a cage. This cartridge is characterized in that the case comprises a support region which is located partly on the connection portion and is adapted to receive the outer bearing surface of the outer ring, and a collar placed in the chamber and having an end portion adapted to come into contact with the inner bearing surface of the inner ring.

The invention also provides the application of such a cartridge including a rolling bearing, for example a ball bearing, having an oblique contact, in a steering column of a motor vehicle, for example a ground vehicle.

BRIEF DESCRIPTION OF THE DRAWINGS

Further features of the invention will be apparent from the following description and claims and with reference to the accompanying drawings which are provided solely by way of example and in which:

FIG. 5 is a view similar to that of FIG. 2 of another embodiment;

FIG. 6 is a view similar to that of FIG. 2 of a further embodiment; and

DETAILED DESCRIPTION OF THE INVENTION

Figure 1:
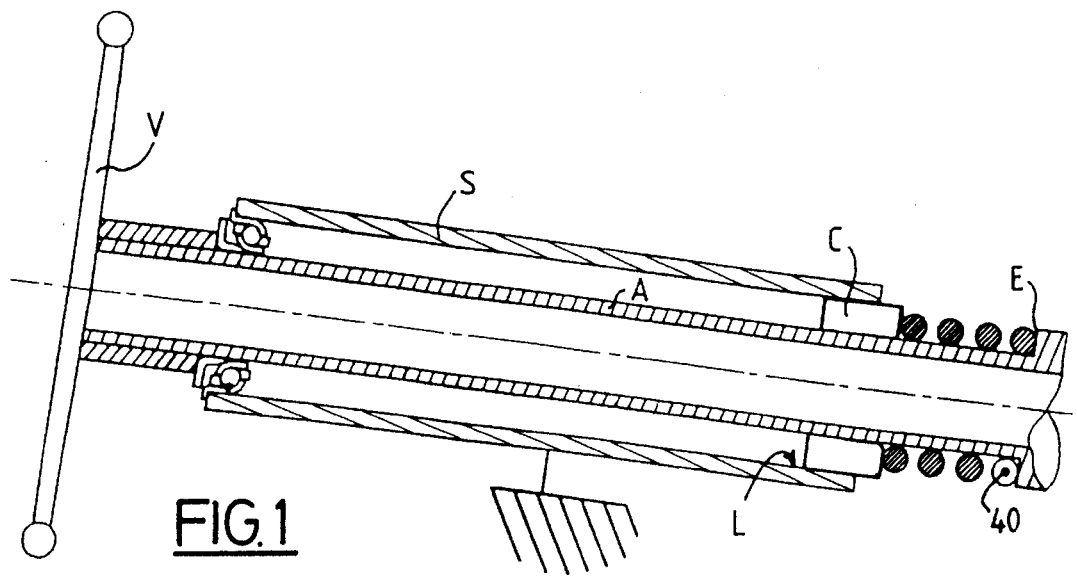
FIG. 1 is a diametrical axial sectional view of an embodiment of a cartridge for a rolling bearing having, for example, a ball bearing, having an oblique contact, according to the invention in a particular application thereof in a steering column for a ground motor vehicle.
Figure 2:
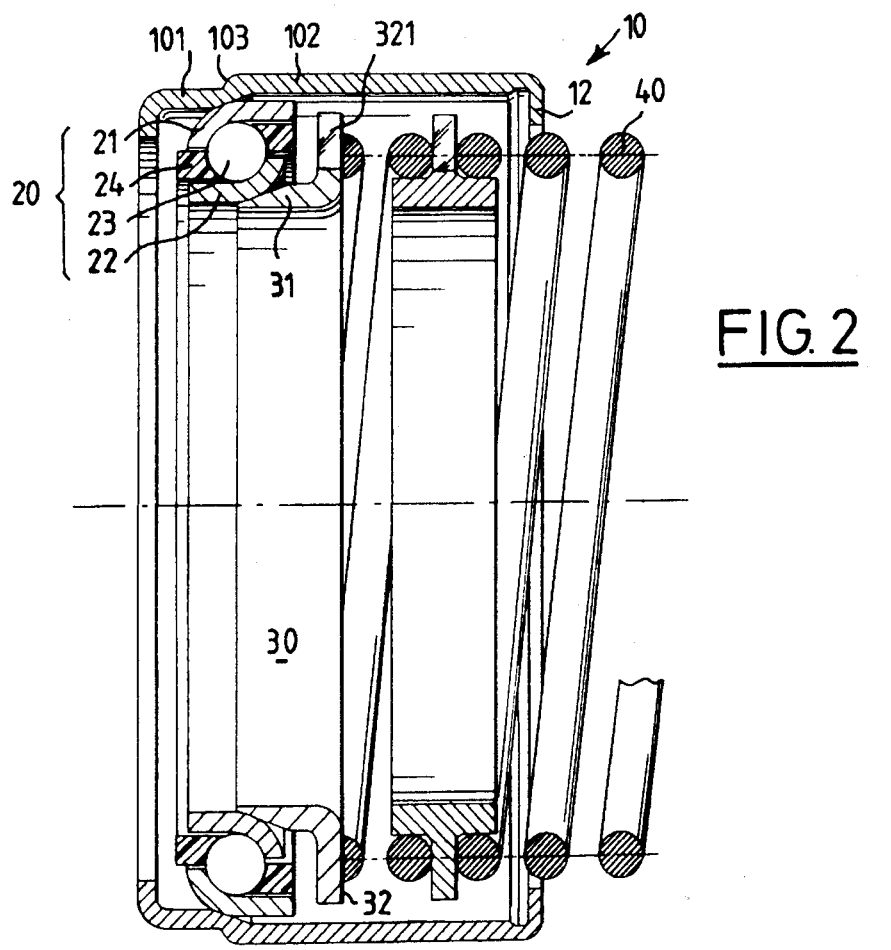
FIG. 2 is a partial diametrical sectional view of an embodiment of a cartridge according to the invention.
Figure 3A:
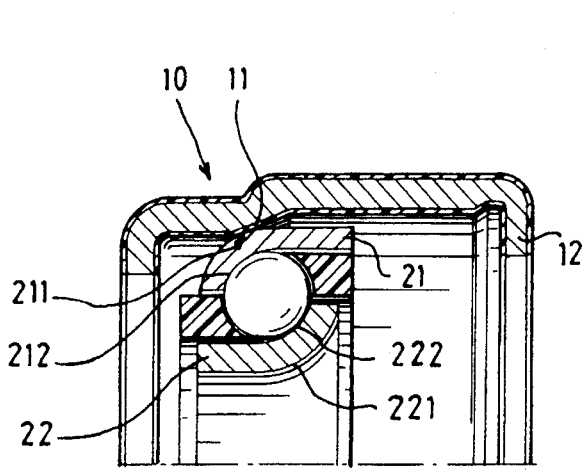
FIGS. 3A, 3B, 3C are views similar to that of FIG. 2 of alternative embodiments of a cartridge according to the invention.
Figure 3B:
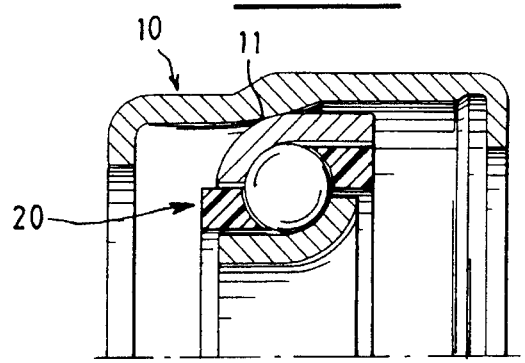
Figure 3C:
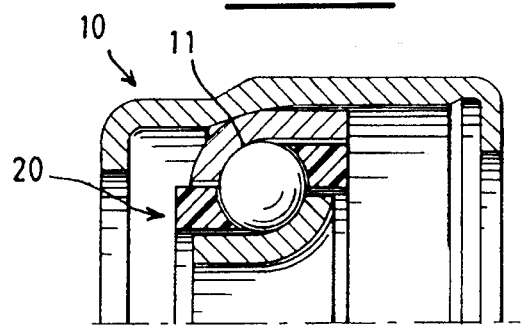
Figure 4:
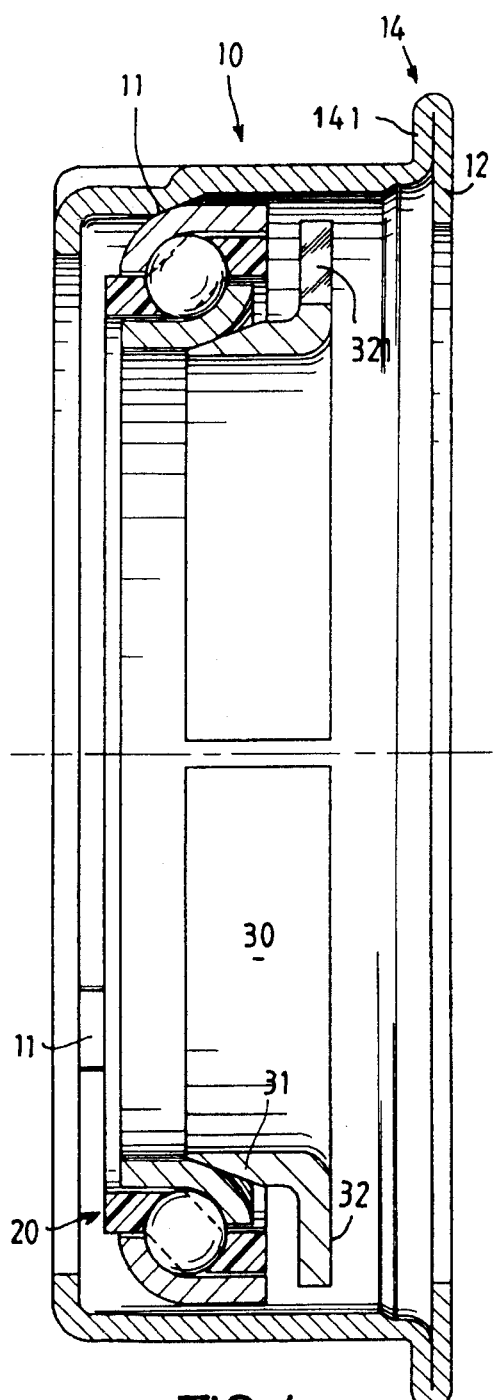
FIG. 4 is a view similar to that of FIG. 2 of another embodiment of the invention.

Rolling bearings, in particular ball bearings, having an oblique contact, on one hand, and steering columns in particular of motor vehicles, for example ground vehicles, on the other hand, are well known in the art and only that which directly or indirectly concerns the invention will be described. For the rest, one skilled in the art of the considered field will derive inspiration from current conventional arrangements available for solving particular problems that are confronted. In particular, reference may usefully be made to the aforementioned documents for further information.

In the following description the same reference numerals will always be used for identifying similar elements irrespective of the embodiment or the alternative embodiment.

For convenience of description, each of the components of a cartridge according to the invention will be described in succession before explaining if need be the manufacture, the utilization and the operation of the cartridge.

A cartridge according to the invention will be described in the particular application thereof in steering columns of ground motor vehicles, but it will be clear that this specific application is not the only one possible.

As can be seen in FIG. 1, a steering column for a ground motor vehicle comprises, in particular, a support S intended to be directly or indirectly fixed to the body or structure of the vehicle and a section A of a column shaft at the free end of which is placed a steering wheel V. Such a shaft section is mounted in the support by means of at least one bearing, and preferably two bearings, each placed in a housing L of the support, as illustrated. Preferably, at least one of these bearings is a rolling bearing, in particular a ball bearing, having an oblique contact and disposed in a cartridge C according to the invention. Preferably, for this purpose the shaft section is provided with an annular or like shoulder E for reasons which will be clear hereinafter.

As can be seen in FIG. 2–FIG. 6, a cartridge according to the invention comprises mainly a case or casing 10, a rolling bearing 20, a collar 30 and, if need be, a spring 40.

The case 10 preferably has two successive axial sections 101, 102 having different sizes and, if need be, different configurations, and an intermediate connection 103 part interconnecting the sections. This case defines an inner chamber.

The case 10 further comprises a support region 11, inside the chamber and located on the connection 103, and whose function will be clear hereinafter. The support region 11 is continuous or preferably discontinuous and in this case comprises for example three areas spaced angularly equal distances apart. This support region is conical or spherical, for example concave or convex.

The case 10 further comprises retaining means 12 the function of which will be understood hereinafter. These retaining means 12 comprise at least one centripetal nose portion 121 which is preferably carried by a tongue 122 associated with the section of the case that is of largest size, as illustrated in the drawings.

The case 10 also preferably comprises a support 13 which is preferably in the form of centripetal radial flanges or arms, for example evenly spaced apart and carried by the section of the case that is of largest size, as illustrated in the drawings.

Figure 7:
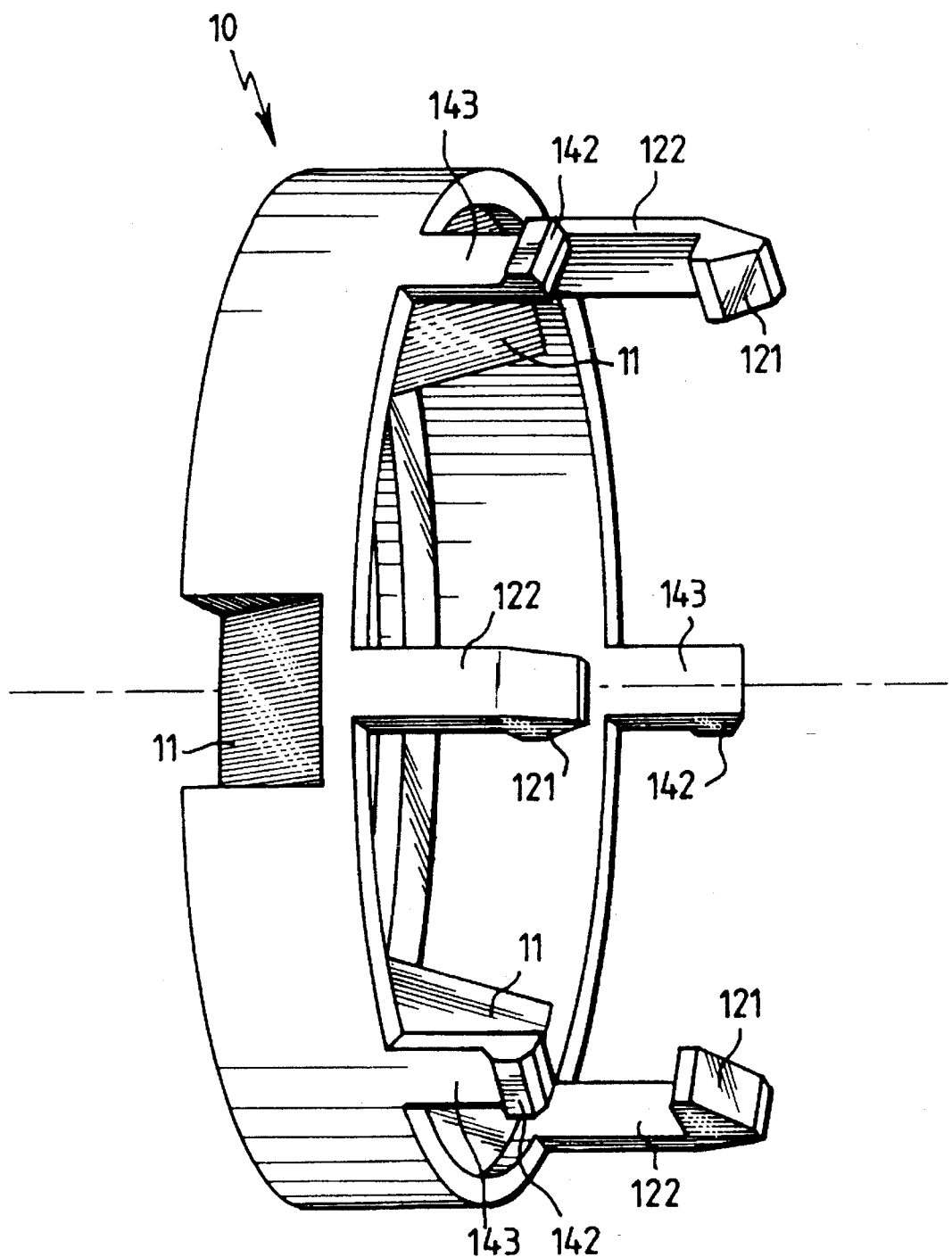
FIG. 7 is a partial perspective view of a component part of the embodiment shown in FIG. 6.

The case 10 is provided, if need be, with a device 14 for axially maintaining the case in the housing which receives the cartridge. Such a maintaining device 14 comprises for example a continuous centrifugal ledge 141 in the form of a flange or a discontinuous ledge carried by the largest size section of the case in one embodiment (FIG. 4), or comprises for example at least one centrifugal projection 142 such as a tab or a lug capable of cooperating with a complementary recess D of the housing in another embodiment (FIG. 5). Preferably, the projection 142 is carried by a strip 143 of the case (FIGS. 6 and 7).

The rolling bearing 20 mainly comprises an outer ring 21 and an inner ring 22 between which rolling members 23 such as balls are disposed, if need be, mounted in a cage 24. As can be seen, the cup-shaped outer ring 21 has an outer bearing surface 211 and a toric outer raceway 212. Likewise, the inner cup-shaped ring 22 comprises an inner bearing surface 221 and an inner toric raceway 222.

The collar 30 comprises an end portion 31, preferably conical or the like, intended to cooperate with the inner bearing surface 221 of the inner ring 22 for reasons which will be clear hereinafter, and a stop 32 adapted to cooperate with spring 40 for reasons which will be apparent hereinafter. If need be and preferably, the stop 32 is locally provided with at least one recess 321 allowing the collar 30 to be placed in the chamber without being hindered by the retaining means 12 and/or, as will be understood hereinafter, by the support 13. These recesses and retaining means cooperate for example in the manner of a bayonet assembly. They allow the collar to be placed in position in the chamber, for example by initially placing the nose portions and the recesses in alignment so that they engage one another for the introduction of the collar in the chamber. Then, for example by rotation of the collar, the nose portions are placed in alignment with the stop and prevent the collar from leaving the chamber.

Spring 40, for example a helical coil spring and if need be in two parts, is preferably placed in the chamber in such manner as to rest both against the support 13 of the case 10 and the stop 32 of the collar 30 so as to apply, on one hand, the rings 21 and 22 and the rolling members 23 against one another and, on the other hand, the outer bearing surface 211 of the outer ring 21 and the support region 11 of the case 10 against one another.

The case is made for example of metal and, in this case, it may be untreated so as to acquire a hardness as great as that of a raceway and avoid being fragile and excessively brittle. The metal case is preferably covered on at least one of its two faces and, if need be, on both faces, with a layer of a suitable synthetic material of appropriate thickness which acts as a vibration damper and if need be as means for taking up clearance play, as will be understood hereinafter. This case may also be completely made of a suitable synthetic material which is strong and resists vibrations particularly well. A material suitable for such an application is for example that which has the name HYTREL in the catalogue of the firm DUPONT DE NEMOURS.

The rolling bearing 20 proper is made of any suitable conventional materials.

The collar 30 is for example of metal or an appropriate synthetic material.

All the components of a cartridge according to the invention are made in accordance with conventional techniques suitably adapted to the materials of which they are made and are combined, assembled and mounted as is particularly well illustrated in the drawings.

In particular, the procedure is, after having placed the rolling bearing in the chamber of the case, to place the collar in position, the recesses of its stop permitting at least temporarily avoiding the support and retaining means which subsequently maintain the whole assembled in a normally inseparable unit ready for use. If need be, this cartridge also contains the spring which is completely or partly placed in the chamber and, if need be, in the at least partly stressed state.

With this unit constituting the cartridge prepared in this way, it is sufficient to place it in position in its housing.

Depending on the end of the steering column for which a cartridge according to the invention is used, it is the continuous or discontinuous flange of the axial maintaining device which determines the longitudinal position of the cartridge by bearing for example against the corresponding free edge of the support of the steering column. The projection or projections in the form of tabs or lugs, for example each carried by a strip, are engaged in a suitable recess of the housing of the support of the steering column. Such a recess has for example the form of a circular groove or a cavity or cavities adapted to the geometry of the projections as concerns shape and distribution. As can be seen, when projections on tabs are employed, as soon as the cartridge is correctly engaged in its housing, these tabs can no longer become deformed outwardly to permit the tabs or the lugs to escape from the recess and leave the latter and thereby render the cartridge indestructible.

It is then sufficient, if need be, to at least partly release the spring from its support of the case so that it comes to bear against the suitable shoulder of the shaft section of the steering column, as illustrated in FIG. 1.

As can be seen, in the cartridge according to the invention, the outer raceway of the outer ring is in "overhanging" relation and physically "disconnected" from any contact with the housing receiving the case. In this way, the support of the steering column in which the housing is provided accepts manufacturing tolerances on the order of 0.5 mm and defects in shape which impart thereto an oval configuration on the order of 1 mm on a diameter on the order of 30 to 40 mm, without risk of the rolling bearing proper yielding or breaking.

The fact of adopting a support region for the case, which is discontinuous and preferably made up of areas spaced 120° apart, results in an isostatic support. In this way, no radial clearance appears under the effect of the axial force of the spring. Indeed, otherwise in the case of an oval housing or case and for example a continuous conical case, the contact will occur only in two points of the cone where the inscribed circle is the smallest, that where the axial contact occurs first of all and then along a direction perpendicular to that which joins these two points of contact. There would appear a radial clearance or play which would produce noise by clacking and/or defects in rotation if there is a repercussion of this clearance in the rolling bearing.

The outer surface of the case made of a synthetic material, whether this case be completely made of a synthetic material or merely superficially covered with such a material, avoids a direct metal-to-metal contact between the case and the housing of the support of the steering column which transmits well the vibrations.

Thus it can be seen that the invention provides a cartridge with a case containing a rolling bearing having an oblique contact which is easy to construct, transport and place in position and which overcomes most of the drawbacks of the previously-known arrangements.

If need be, the case of the cartridge according to the invention is made in a single continuous or split piece or in a plurality of parts which are united and maintained assembled by uniting means, for example of the clipping type or of the type employing resilient rings or the like.

The foregoing reveals the distinctive features of the invention, the interest of the invention and the resulting advantages.

What is claimed is:

1. Cartridge for a rolling bearing having an oblique contact, which cartridge is intended to be placed in a housing and comprises in combination:

a case which has two successive axial sections of which one section is larger than the other section with an intermediate connection portion uniting said two sections, said case defining a chamber, a rolling bearing disposed in said chamber and comprising an outer cup-shaped ring which has an outer bearing surface and a toric outer raceway, an inner cup-shaped ring which has an inner bearing surface and a toric inner raceway, and rolling members, said case comprising a support region which is located partly on said connection portion for receiving said outer bearing surface of said outer ring, and a collar disposed in said chamber and having an end portion for contacting said inner bearing surface of said inner ring.

2. Cartridge according to claim 1, wherein said rolling members are balls.

3. Cartridge according to claim 1, further comprising a cage for said rolling members.

4. Cartridge according to claim 1, wherein said support region is discontinuous.

5. Cartridge according to claim 4, wherein said support region comprises three areas spaced angularly equal distances apart.

6. Cartridge according to claim 1, wherein said support region is conical.

7. Cartridge according to claim 1, wherein said support region is spherical.

8. Cartridge according to claim 1, wherein said support region is concave.

9. Cartridge according to claim 1, wherein said support region is convex.

10. Cartridge according to claim 1, wherein said case comprises retaining means for maintaining in said chamber said collar and said roller bearing once they have been placed therein.

11. Cartridge according to claim 10, wherein said retaining means comprise in association with said section of larger size at least one centripetal nose capable of impeding said collar and preventing it from leaving said chamber of said case.

12. Cartridge according to claim 11, wherein said at least one nose is carried by a respective tongue.

13. Cartridge according to claim 12, wherein said tongue is flexible.

14. Cartridge according to claim 1, comprising a support on said case for receiving a spring.

15. Cartridge according to claim 1, comprising a stop on said collar adjacent an end of said collar remote from said end portion for receiving a spring.

16. Cartridge according to claims 15, comprising a support on said case for receiving said spring which is disposed in said chamber and bears against said support of said case and against said stop of said collar so as to apply said rings and said rolling members against one another and apply said outer bearing surface of said outer ring and said support region of said case against one another.

17. Cartridge according to claim 16, wherein said spring is a helical coil spring.

18. Cartridge according to claim 1, comprising a device for axially maintaining said case in the housing to receive said cartridge.

19. Cartridge according to claim 18, wherein said maintaining device comprises a centrifugal flange carried by said section of larger size of said case.

20. Cartridge according to claim 18, wherein said maintaining device comprises at least one centrifugal projection to cooperate with a respective complementary recess provided in the housing.

21. Cartridge according to claim 20, wherein said projection is carried by a strip of said case.

22. Combination comprising:

a steering column of a motor vehicle including a steering column support defining a housing and a steering shaft within said housing, and a cartridge for a rolling bearing having an oblique contact, said cartridge being interposed between and engaged with said housing and said shaft and comprising in combination: a case which has two successive axial sections of which one section is larger than the other section with an intermediate connection portion uniting said two sections, said case defining a chamber, a rolling bearing disposed in said chamber and comprising an outer cup-shaped ring which has an outer bearing surface and a toric outer raceway, an inner cup-shaped ring which has an inner bearing surface and a toric inner raceway, and rolling members, said case comprising a support region which is located partly on said connection portion for receiving said outer bearing surface of said outer ring, and a collar disposed in said chamber and having an end portion for contacting said inner bearing surface of said inner ring.

* * * * *